Jan. 1, 1963  J. A. ROBERTS  3,071,722
LEAK DETECTOR
Filed Jan. 2, 1962

INVENTOR.
JOHN A. ROBERTS
BY
Irving M. Freedman
HIS ATTORNEY

United States Patent Office 3,071,722
Patented Jan. 1, 1963

3,071,722
LEAK DETECTOR
John A. Roberts, Lynnfield Center, Mass., assignor to General Electric Company, a corporation of New York
Filed Jan. 2, 1962, Ser. No. 163,670
6 Claims. (Cl. 324—33)

This invention relates to improvements in the method and apparatus for detecting certain substances present in gases and vapors as described in U.S. Patent 2,550,498—Rice, issued April 24, 1951 and assigned to the same assignee as the present application.

In the Rice patent there are disclosed methods and apparatus for detecting substances such as certain gases, vapors, smokes, and similar matter in an atmosphere by directing a sample of an atmosphere suspected of containing a concentration of the substance to be detected into an electrical discharge device under conditions which permit the substance to induce positive ion formation at a more positively charged electrode, the positive ions so formed being collected by a negatively charged electrode to produce an indicating current which varies with the concentration of the substance.

Devices of this type have been used extensively in leak detector equipment. In one form of such equipment, commonly referred to as a halogen leak detector, a halogen tracer gas is introduced into a closed container. A probe which is connected by a flexible tube to the leak detector detecting and indicating circuit is slowly passed over the joints and outer surfaces of the container. Samples of the atmosphere through which the probe passes are drawn into the leak detecting equipment and directed between the ion producing electrodes. When the probe passes over a leak in the enclosure, tracer gas which has passed through the leak from the interior of the enclosure is drawn into the region between the electrodes to indicate the presence and location of a leak.

In the aforementioned Rice patent the atmosphere being tested is sucked through a relatively large diameter flexible tube by a small centrifugal blower. The atmosphere is then caused to flow between the ion producing electrodes.

An improvement on commercial forms of such an arrangement is disclosed in U.S. Patent 2,591,485—White, which issued on April 1, 1952 and is assigned to the same assignee as the present invention. In the White patent there is a recognition of the advantages in, and a discussion of, the problems resulting from removing the sensitive element containing the electrodes and the blower from the probe assembly to the equipment chassis. In the White patent the discharge element and pump are positioned on the chassis of the equipment. Such an arrangement provides ease of manipulation of the probe, protection of the sensitive element from mechanical shock, and elimination of electrical leads in the flexible tube connecting the probe and chassis.

The problems of providing good sensitivity and fast response are overcome through the use of relatively fine tubing or conduit leading to the space between the discharge elements, with the space between the discharge elements having a substantially greater cross-section than the conduit.

In the White arrangement and in commercial equipment utilizing relatively fine tubing connecting to discharge electrodes of substantially greater cross-section, the vacuum pump has been located such that the atmosphere being examined is drawn successively through the flexible fine tubing to the discharge elements and thence through the vacuum pump. In drawing gases through fine diameter tubing it is necessary to provide a relatively high vacuum, in the order of five to eight inches of mercury, and also to insure that the enclosure within which the discharge elements are located is vacuum-tight in order to provide such a vacuum. A centrifugal type of blower such as described in the aforesaid Rice patent is not generally suitable for use with fine diameter tubing in such arrangements since it normally will not provide a sufficient degree of vacuum.

While the arrangement described in the aforesaid White patent has been used extensively in commercial leak detector equipment, it is desirable to simplify and improve such equipment.

An object of this invention is to provide a simplified apparatus of the above general type.

Another object of the present invention is to provide an improved apparatus of the above type in which the discharge element and vacuum pump are located on the chassis instead of in a separate head, and in which problems of cooling the discharge elements are minimized.

A further object of the invention is to provide improved apparatus of the above type having high sensitivity and fast response yet being more reliable in operation, simplified, and less costly.

Further objects and advantages of this invention will become apparent as the following description proceeds and the features of novelty which characterize the invention will be pointed out with particularity in the claims annexed to and forming a part of this specification.

It has been found that the above objects may be realized quite simply.

In accordance with one form of the invention the probe of a leak detector system is connected successively through a relatively thin vapor conduit, a vacuum pump, a diffuser, and thence to the discharge elements of substantially greater cross-section than the conduit. More particularly, the vacuum pump draws the vapor through the thin conduit and discharges through a diffuser to the region between the discharge elements, with the diffuser being funnel-shaped with progressively increasing diameter.

For a better understanding of the invention, reference may be had to the following specification taken in conjunction with the accompanying drawings in which.

Figure 1A:
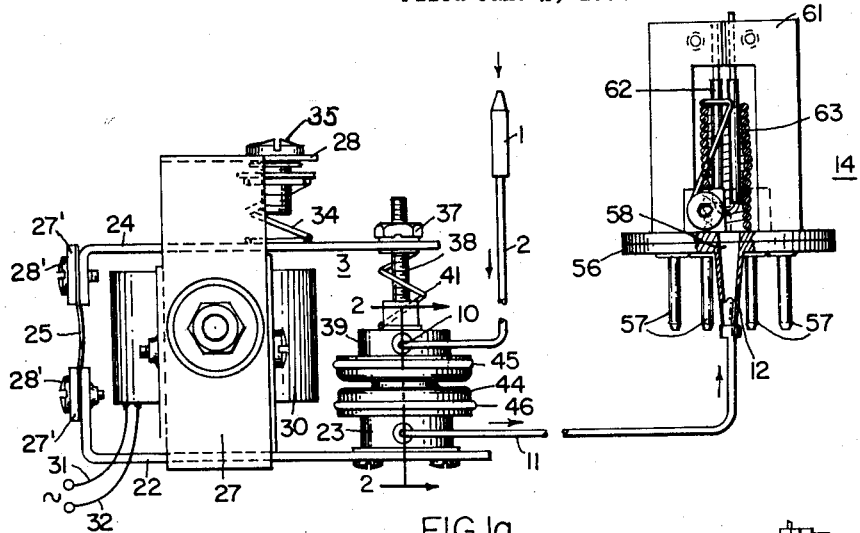
FIG. 1A is a more detailed showing of a portion of FIG. 1.
Figure 1:
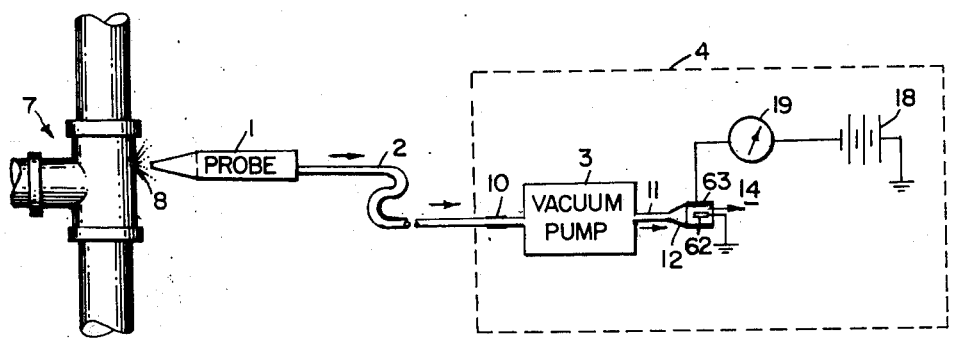
FIG. 1 is a schematic showing, partially in block diagram form, of a leak detector system incorporating the invention.

Referring to FIG. 1, a leak detector system with which the subject invention may be utilized is shown, and includes a probe 1 connected by a relatively fine flexible tubing 2 having an inside diameter in the order of .05 inch to the inlet 10 of vacuum pump 3 positioned within the chassis or housing 4 of the leak detector sensing and indicating unit.

The probe 1 comprises a tubular plastic member having an aperture connecting to the tubing 2 and adapted to be held by the operator. The probe 1 is moved relative to an enclosed system indicated generally as 7 to which a tracer gas of the halogen family has been introduced to detect and localize leakage in the system by detection of the halogen gas on the outside of the enclosure. The probe is slowly passed by fittings and areas suspected of leakage and when it passes a point of leakage 8 halogen gas is drawn through probe 1 and tubing 2 through the inlet 10 of the vacuum pump 3 and is discharged through outlet tubing 11 having an inside diameter in the order of .05 inch to the narrow end of diffuser 12 located in the socket portion of the vapor detector or sensitive element 14. The halogen gas then passes through the diffuser and between the ion source electrode 62 and the surrounding tubular ion collector electrode 63 having an inside diameter in the order of 7/32 of an inch. Reference may be had to my U.S. Patent 3,009,074, which issued November 14, 1961 and is assigned to the same assignee as the present invention, for the constructional and mounting details of a suitable vapor detector 14. It is sufficient to point out at this time that the heated ion source 62 provides positive ion formation at a rate which varies in accordance with the concentration of halogen gas passing between the ion source electrode 62 and the ion collector electrode 63. The ions formed are collected at the collector electrode 63 through the action of battery 18 connected in series with a microammeter or other indicator 19 and connected between the ion source electrode and ion collector electrode. As discussed in the aforementioned patents, the magnitude of the current flow through the circuit including the leak indicator 19 will vary in response to the presence and magnitude of the tracer gas passed through the vapor detector.

Figures 2, 3:
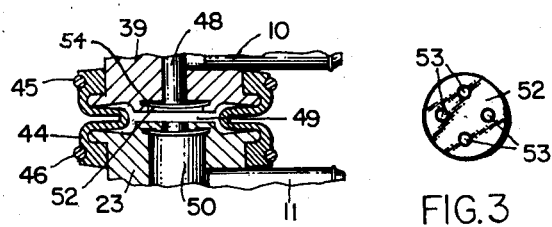
FIG. 2 is an enlarged cross-sectional view of a portion of the vacuum pump shown in FIG. 1A.
FIG. 3 is an enlarged top view of the disc valve of the vacuum pump shown in FIG. 2 and along with FIG. 2 is useful in explaining the operation of the pump.

The operation of a vacuum pump suitable for use with the subject invention is shown in more detail in FIGS. 1A, 2 and 3. Referring to these figures, it will be seen that the vacuum pump 3 includes a base member 22 to which the outlet portion 23 of the pump is connected. The base 22 is of generally L-shaped configuration and is separated from the somewhat similar upper L-shaped part 24 by a flexible resilient connecting member 25 so that in combination a generally U-shaped configuration is formed in which the upper part may move relative to the base. The flexible member 25 is secured to the members 22 and 24 by a pair of clamping blocks 27' and screws 28'. A support member 27 secured to the base 22 extends along the side of members 22 and 24 and has a perpendicular extension portion 28 extending parallel to and spaced above the upper L-shaped member 24. Secured to the support member 27 and positioned within the base portion of the U formed by members 22 and 24 is an electrical coil 30 adapted to be energized by alternating current through leads 31 and 32. The upper L-shaped part 24 is constructed of magnetic material such that upon the energization of coil 30 with alternating current, the L-shaped member is periodically drawn toward the coil. A coil spring 34 is interposed between the upper L-shaped part 24 and the extension portion 28 of support member 27. A screw driver adjustment 35 may be associated with the upper portion of the spring 34 to adjust the tension thereof and thus the upward or return movement of the member 24.

An internally threaded member 37 is secured to the open end of the upper L-shaped member 24 and cooperates with a threaded extension member 38 to adjustably support the upper or inlet portion 39 of the pump 3. A coil spring 41 is interposed between the member 24 and the inlet portion 39. A flexible rubber sleeve member 44 overlies the upper and lower portions 39 and 23 of the pump 3 and is secured thereto by clamping rings 45 and 46, respectively.

As best shown in FIGS. 2 and 3, the inlet passageway 10 connects to an axial passageway comprising upper passageway 48, central cavity 49 and the lower axial passageway 50 which communicates with the outlet passageway 11. A disc valve 52 is positioned within a radially extending groove 54 in the upper portion 39 above the central cavity 49 and has a plurality of apertures 53, none of which are in alignment with the upper passageway 48. The disc valve 52 is constructed from a thin disc of resilient rubber which is bowed a sufficient amount to enable it to be inserted into the groove 54 in the upper portion 39, and upon the release thereof, it flattens a sufficient amount to fill the groove.

In operation, as the upper portion 39 of the pump is driven away from the lower portion 23 by flexible member 25 and rubber sleeve 44 vapor is drawn into the central cavity 49 through the inlet 10 and upper passageway 48 past the apertures 53 of disc valve 52 which will bow downward because of the vacuum developed in the central cavity. Upon the reverse cycle as the upper portion 39 moves downward in response to the magnetic attraction provided by coil 30 the disc valve 52 is driven against the upper passageway 48 such that central region thereof closes the passageway 48 and the entrapped vapor in the central cavity 49 is driven out through the passageway 11. Thus vapor is successively drawn in through passageway 10 and driven out through passageway 11. It is to be noted that the volume of the suction passages of the vacuum pump 3, including passageways 48 and 49, are relatively small. The portions 39 and 23, respectively, of pump 3 in the region of central cavity 49 are grooved to form a recess into which the fold of rubber member 44 may flatten, insuring a small volume for the central cavity. The small volume of the suction passageways decreases the response and recovery time of the leak detector equipment and provides a high compression pumping action.

Figure 4:
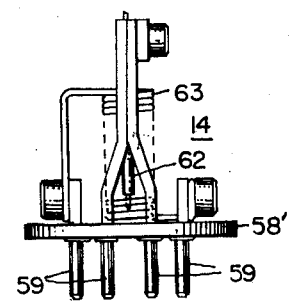
FIG. 4 is a side view of the discharge elements of the vapor detector assembly shown in FIG. 1A.

Some of the constructional details of the vapor detector 14 may be best explained with reference to FIGS. 1A and 4. Referring to these figures, it will be seen that a plug-in arrangement is provided. The socket type of base assembly 56 is provided with a plurality of contact receptacles 57 and includes a central aperture 58 to which the diffuser 12 connects. The plug-in vapor detector as shown in FIG. 4 includes a base portion 58' having a plurality of male contacts 59 which cooperate with contact receptacles 57 to provide electrical connections to the vapor detector. The vapor detector includes the generally inverted U-shaped support member 61 to which the U-shaped ion emitter or ion source electrode 62 is clamped in a manner described in more detail in my aforesaid patent. The ion source electrode 62 is surrounded by the cylindrical ion collector electrode 63 formed from a spirally wound Nichrome wire having an inside diameter in the order of 7/32 of an inch. Thus, vapor delivered by the outlet conduit 11 through the diffuser 12 passes within the cylindrical ion collector electrode and in the region between the ion source electrode and the ion collector electrode to cause variations in ion formation in accordance with the presence of the halogen tracer gas in the vapor being examined.

The leak detector arrangement shown and described above results in a plurality of advantages over prior arrangements. The vapor detector 14 and vacuum pump 3 are not associated with the probe 1, making the probe more rugged and easier to manipulate and avoiding the problem of electrical leads in the flexible tube 2. The vapor detector 14 need not be enclosed in a gas-tight enclosure since the vacuum pump 3 does not draw through the vapor detector, but rather discharges directly between the ion source 62 and the surrounding tubular ion collector 63. Furthermore, since the sensitive element need no longer be enclosed within a gas-tight enclosure, it may be freely vented to the interior of the housing 4 and, if desired, the housing may be vented thus avoiding the problem of cooling the vapor detector.

Even more important than the simplification in construction and the accompanying manufacturing cost reduction of leak detector systems described above is the resultant improvement in performance and reliability. It appears that the vacuum pump 3 functions better and with more reliability than systems in which the sensitive element 14 is interposed between the probe 1 and the vacuum pump. This is believed to be due to a plurality of reasons. The vacuum pump 3 passes only the gases and atmospheres drawn in by the probe 1 prior to their being heated by the relatively hot (approximately 900° C.) ion source such that the vacuum pump pumps only relatively cool gases prior to heating and expansion. Furthermore, it is believed that greater reliability of operation and increased life of the vacuum pump results since the vacuum pump no longer pumps heated tracer gas, which gas when heated is believed to contain corrosive decomposition products which might cause deterioration and malfunction of the pump. Also, cool gas can be more readily and more quickly pumped than hot gas.

While a particular embodiment of the subject invention has been shown and described herein, it is in the nature of description rather than limitation, and it will occur to those skilled in the art that various changes, modifications, and combinations may be made within the province of the appended claims without departing either in spirit or scope from this invention in its broader aspects.

What I claim as new and desire to secure by Letters Patent of the United States is:

1. A leak detector system comprising: a vapor detector including a pair of spaced electrodes, means for impressing an electric potential across said electrodes, a probe assembly including a first relatively thin vapor conduit, a vacuum pump for drawing vapor through said relatively thin conduit, and a second relatively thin output conduit leading from said vacuum pump for discharging vapor drawn therethrough to the region between said pair of electrodes, said region between said electrodes being of substantially greater cross-section than said relatively thin conduits.

2. A leak detector system comprising: a vapor detector including a pair of spaced electrodes forming a region therebetween adapted to enable the flow of a vapor therethrough, means for impressing an electric potential across said electrodes, a probe assembly including a first relatively thin vapor conduit, a vacuum pump for drawing vapor through said relatively thin conduit, and a second relatively thin output conduit leading from said vacuum pump for discharging vapor drawn therethrough to the region between said pair of electrodes, said region between said electrodes being of substantially greater cross-section than said relatively thin conduits.

3. A leak detector system comprising: a vapor detector including a first electrode surrounding a second electrode forming a region therebetween adapted to enable the flow of a vapor therethrough, means for impressing an electric potential across said electrodes, a probe assembly including a first relatively thin vapor conduit, a vacuum pump for drawing vapor through said relatively thin conduit, a second relatively thin output conduit leading from said vacuum pump for discharging vapor drawn therethrough to the region between said pair of electrodes, said region between said electrodes being of substantially greater cross-section than said relatively thin conduits, and a funnel-shaped diffuser connecting said second relatively thin conduit to the region between said pair of electrodes.

4. A leak detector system comprising: a vapor detector including a pair of spaced electrodes forming a region therebetween adapted to enable the flow of a vapor therethrough, means for impressing an electric potential across said electrodes, a probe assembly including a first relatively thin vapor conduit, a vacuum pump for drawing vapor through said relatively thin conduit, a second relatively thin output conduit leading from said vacuum pump for discharging vapor drawn therethrough to the region between said pair of electrodes, said region between said electrodes being of substantially greater cross-section than said relatively thin conduits, a funnel-shaped diffuser connecting said second relatively thin conduit to the region between said pair of electrodes, said electrodes, pump and diffuser being positioned within the same housing, and said first relatively thin conduit being of flexible material.

5. A leak detector system comprising: a vapor detector including a pair of spaced electrodes forming a region therebetween adapted to enable the flow of a vapor therethrough, means for impressing an electric potential across said electrodes, a probe assembly including a first relatively thin vapor conduit, a vacuum pump of the relatively low volume high-vacuum type for drawing vapor through said relatively thin conduit, and a second relatively thin output conduit leading from said vacuum pump for discharging vapor drawn therethrough to the region between said pair of electrodes, said region between said electrodes being of substantially greater cross-section than said relatively thin conduits.

6. A leak detector system comprising: a vapor detector including an ion source electrode surrounded by a substantially cylindrical ion collector electrode, means for impressing an electric potential across said electrodes, a probe assembly including a first relatively thin vapor conduit, a vacuum pump for drawing vapor through said first relatively thin conduit, a second relatively thin output conduit leading from said vacuum pump for discharging vapor drawn therethrough to the region between said pair of electrodes and inside said ion collector, the diameter of said conduits being substantially less than that of said ion collector, and a funnel-shaped diffuser of progressively increasing diameter connected between said second conduit and the region between said pair of electrodes.

No references cited.